United States Patent
Stufflebeam

(10) Patent No.: US 6,460,106 B1
(45) Date of Patent: Oct. 1, 2002

(54) BUS BRIDGE FOR HOT DOCKING IN A PORTABLE COMPUTER SYSTEM

(75) Inventor: Ken Stufflebeam, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/175,887

(22) Filed: Oct. 20, 1998

(51) Int. Cl.$^7$ ................................................ G06F 13/00
(52) U.S. Cl. ...................................... 710/304; 710/302
(58) Field of Search ................................. 710/100, 101, 710/102, 103, 126, 129, 300, 301, 302, 303, 304, 305, 306; 713/320, 323, 324, 128

(56) References Cited

U.S. PATENT DOCUMENTS

| | | | |
|---|---|---|---|
| 5,598,537 A | * 1/1997 | Swanstrom et al. | 395/281 |
| 5,598,539 A | * 1/1997 | Gephardt et al. | 710/101 |
| 5,632,020 A | 5/1997 | Gephardt et al. | 395/283 |
| 5,721,935 A | * 2/1998 | DeSchepper et al. | 713/323 |
| 5,748,911 A | * 5/1998 | Maguire et al. | 710/101 |
| 5,784,576 A | * 7/1998 | Guthrie et al. | 710/103 |
| 5,793,987 A | * 8/1998 | Quackenbush et al. | 710/100 |
| 5,798,951 A | * 8/1998 | Cho et al. | 364/708.1 |
| 5,873,000 A | * 2/1999 | Lin et al. | 395/892 |
| 5,875,307 A | * 2/1999 | Ma et al. | 710/101 |
| 5,875,308 A | * 2/1999 | Egan et al. | 710/103 |
| 5,933,609 A | * 8/1999 | Walker et al. | 710/101 |
| 5,935,226 A | * 8/1999 | Klein | 710/101 |
| 5,983,354 A | * 11/1999 | Poisner et al. | 713/320 |
| 6,035,355 A | * 3/2000 | Kelley et al. | 710/101 |
| 6,073,196 A | * 6/2000 | Goodrum et al. | 710/103 |
| 6,081,863 A | * 6/2000 | Kelley et al. | 710/129 |

OTHER PUBLICATIONS

"The ACPI specification", Intel/Microsoft/Toshiba, Revision 1.0, Dec. 1996, section 2.3 and 3.*

* cited by examiner

Primary Examiner—Peter Wong
Assistant Examiner—X. Chung-Trans
(74) Attorney, Agent, or Firm—Conley, Rose & Tayon, P.C.

(57) ABSTRACT

A hot dockable computer system comprises an enhanced expansion bus bridge for coupling the computer system to a docking station. The enhanced bus bridge includes an ACPI control unit for controlling the power state of the bridge device and associated buses. The ACPI control unit receives a docking signal from a docking connector on the computer that is asserted to indicate when a docking sequence has completed. When the docking signal is asserted, the bus bridge transmits a PME interrupt to the operating system, which activates the bus bridge. The bus bridge further includes a plurality of switches coupling the expansion bus signals in the computer system to the expansion bus signals in the dock. The ACPI control unit opens the switches when the bus bridge is deactivated, decoupling the expansion bus in the computer from the expansion bus in the dock. Similarly, the ACPI control unit deasserts the control signal to close the switches when the bus bridge is activated, connecting the expansion buses. In addition, the computer system includes a bank of switches for coupling sideband signals that run between the computer and docking station. The ACPI control unit couples or decouples the sideband signals depending on whether the bus bridge is activated or powered down.

52 Claims, 4 Drawing Sheets

Fig. 1 [Prior Art]

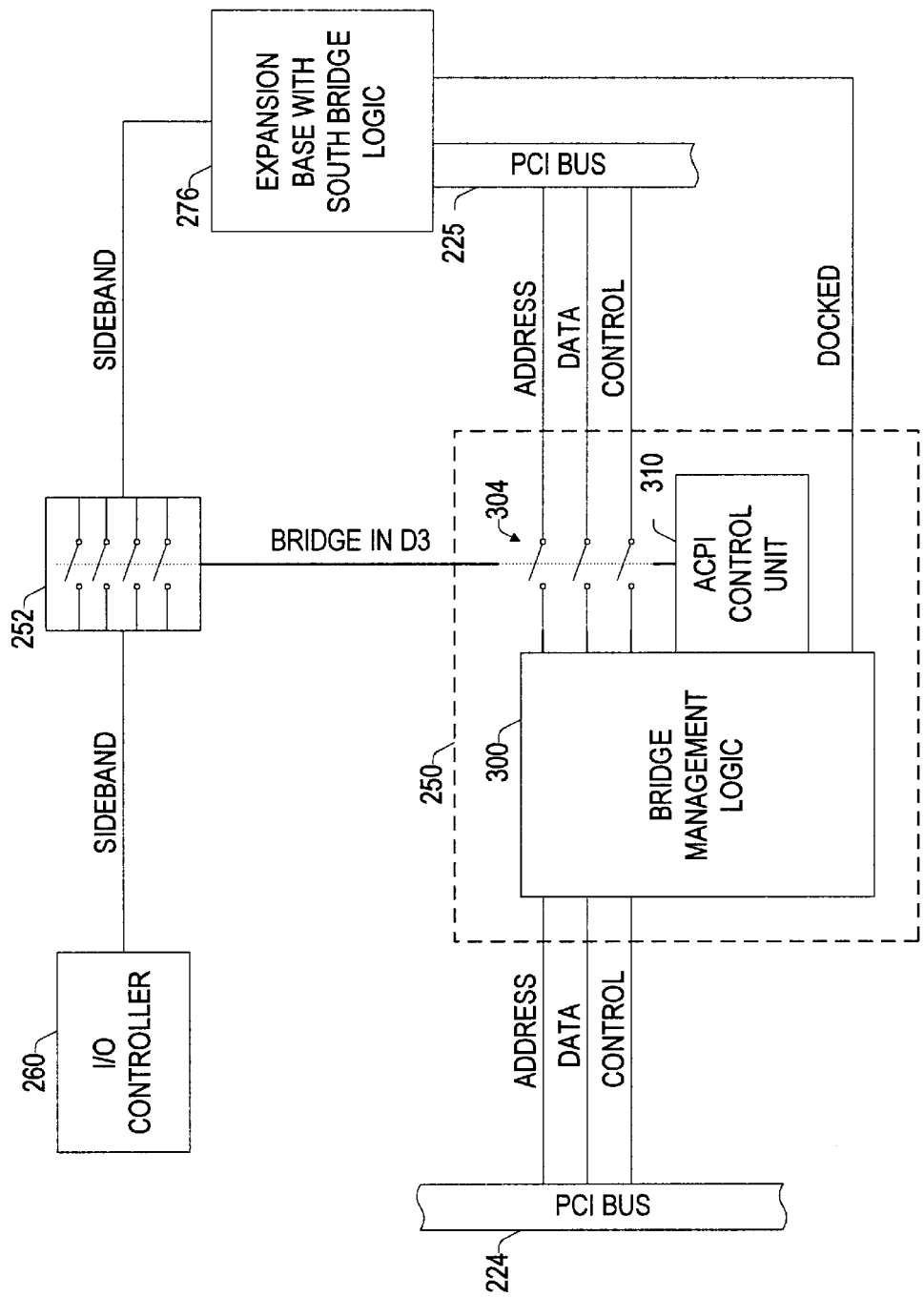

BUS BRIDGE FOR HOT DOCKING IN A PORTABLE COMPUTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to docking of personal computer systems and particularly to a bus bridge that facilitates "hot" docking. More particularly, the present invention relates to an enhanced expansion bus bridge for connecting a computer system to a docking station without requiring the computer system to shut down or enter sleep mode during the docking sequence.

2. Background of the Invention

Many portable computer systems are capable of connecting to a docking station, or an expansion base. The docking station is not actually a part of the portable computer system per se, but instead comprises a separate unit that accommodates the computer. The portable computer electrically connects to the docking station usually by way of an expansion bus, such as a Peripheral Component Interconnect (PCI) or other suitable bus. Because of inherent size and weight restrictions, portable computers tend to require design tradeoffs such as small keyboards and graphics displays, crude cursor control devices, and a limited number of mass storage devices. The docking station (or simply "dock") usually couples to peripheral devices, such as a CD ROM drive, a standard size keyboard, and a large monitor and thus converts the portable computer into a desktop system. Accordingly, the computer user can access valuable features such as additional peripheral components including a large graphics display, a full-size mouse and keyboard, hard and floppy disk drives, CD ROM drives, Digital Video Disk (DVD) drives, and other peripheral components. An expansion base may also offer connections to a local area network (LAN), printer, and modem. Although intended primarily for desktop operation, the utilization of expansion bases has greatly enhanced the usability and comfort of laptop computer systems, handheld computers, and other portable systems, especially when the computer is used frequently in one location, such as in the home or office.

When the portable computer is docked, an expansion bus within the computer typically couples to an expansion bus in the docking station. The expansion bus permits communication (e.g., data transfers) between the computer and a peripheral device in the docking station. Because of the delicate nature of high performance expansion buses such as the PCI bus, care must be taken when designing a docking system and implementing the docking procedure to connect two PCI buses. One factor to consider is that a single expansion bus often can only support a limited number of components. Suddenly "loading" an expansion bus with too many components may severely degrade performance or crash the bus. To facilitate docking in portable computer systems, bus "bridge" devices have been developed that couple the expansion bus within the computer to the expansion bus inside the docking station. Because the computer expansion bus and dock expansion bus are not directly connected to one another, neither expansion bus becomes overloaded due to the docking connection.

FIG. 1 illustrates a representative conventional computer system/docking station configuration. The computer 100 generally includes a CPU coupled to a bridge logic device via a CPU bus. The bridge logic device is sometimes referred to as a "North bridge" for no other reason than it often is depicted at the upper end of a computer system drawing. The North bridge also couples to a main memory array by a memory bus. The North bridge couples the CPU and memory to the peripheral devices in the system through a PCI bus 125 or other expansion bus (such as an EISA bus). Various components that implement the PCI protocol may reside on the computer's PCI bus 125, such as a graphics controller.

If other secondary expansion buses are provided in the computer system, another bridge logic device typically is used to couple the PCI bus 125 to that expansion bus. This bridge logic is sometimes referred to as a "South bridge," reflecting its location vis-a-vis the North bridge in a typical computer system drawing. In FIG. 1, the South bridge couples the computer PCI bus 125 to an ISA bus. Various ISA-compatible devices are shown coupled to the ISA bus.

The South bridge may also support an input/output (I/O) controller that interfaces to basic input/output devices (not shown) such as a keyboard, a mouse, a floppy disk drive, and various input switches such as a power switch and a suspend switch. The I/O controller typically couples to the South bridge via a standard bus, shown as an ISA bus in FIG. 1. A serial bus, which generally is a bus with only one data signal, may provide an additional connection between the I/O controller and South bridge. The I/O controller typically comprises an ISA bus interface (not specifically shown) and transmit and receive registers (not specifically shown) for exchanging data with the South bridge over the serial bus.

The I/O controller generally has the capability to handle power management functions such as reducing or terminating power to components such as the floppy drive (not shown), blocking the clock signals that drive components such as the bridge devices and CPU, and initiating sleep mode in the peripheral buses. The I/O controller further asserts System Management Interrupt (SMI) signals to various devices such as the CPU and North bridge to indicate special conditions pertaining to input/output activities such as sleep mode. The I/O controller typically incorporates a counter or a Real Time Clock (RTC) to track the activities of certain components such as the hard drive and the PCI bus 125, inducing a sleep mode or reduced power mode after a predetermined time of inactivity. The I/O controller may also place the computer system into a low-power mode, in which the power to all devices except the I/O controller itself shuts off completely.

The computer system also includes a bus bridge for coupling the expansion bus within the computer to an expansion bus housed in a docking station. A typical docking station 150 with a PCI bus 175 is pictured in FIG. 1 and coupled to the PCI bus 125 within the computer system. As shown, a PCI-to-PCI bus bridge device 130 couples the two PCI buses 125 and 175. An exemplary PCI-to-PCI bridge device is the 21554 PCI-to-PCI bridge manufactured by Intel Corporation.

The docking station 150 pictured in FIG. 1 also includes a South bridge logic (not shown specifically) for coupling components connected to the computer's PCI bus 125 to other components contained within the docking station 150.

Thus, as shown in FIG. 1, a South bridge logic device within the docking station couples the PCI bus 125 to various expansion buses including an ISA bus, a universal serial bus (USB), and an integrated drive electronics (IDE) bus. The docking station 150 also supports a local area network (LAN) connection such as Ethernet. In addition to the PCI signals that are provided between the computer 100 and the dock 150, various "sideband" signals within the docking station 150 must be connected to the computer system 100 during docking. These sideband signals typically connect to the I/O controller but may be connected to virtually any component within the computer. Examples of sideband signals include power and ground signals, interrupt signals, and I/O signals such as serial and parallel port signals, keyboard and mouse signals, and audio and video signals. Accordingly, the South Bridge logic in the docking station 150 may incorporate an interrupt controller to generate the interrupt signals, and the docking station 150 may include dedicated I/O controllers coupled to the I/O devices and that transmit the sideband signals.

A significant problem inherent in docking relates to electrical "transients" and voltage mismatches that can occur when the connectors on the computer 100 and docking station 150 are first mated. When the opposing connectors first meet, a slight but rapid "bouncing" action may occur between the electrical contacts on the connectors. The bouncing action repeatedly connects and then disconnects the contacts, causing the current to flow intermittently. When opposing contacts are engaged, electric current may flow through the connection. When the opposing contacts are separated, the electric current is stopped. Thus, bouncing connectors cause intermittent current flow. In addition to the bouncing problem, differences in reference voltage levels (i.e., ground levels) between the computer and docking station can produce current "spikes," or large inrushes of current, when the connectors are mated. Current spikes are highly undesirable and can cause component damage and reduce battery life. Virtually all of the signals that connect the computer system to the docking station, including expansion bus signals and also sideband signals, are susceptible to electrical transients and voltage spikes during the docking procedure.

In order to avoid transient problems, early computer designs required shutting off the computer system before docking, a procedure known as "cold docking." Although shutting off the computer effectively prevents the undesirable electrical problems described above, the user must power on the computer after docking and endure a lengthy and annoying reboot sequence before the computer can be used.

Recent computer systems have been capable of safely docking without completely powering down by implementing a variety of power modes, each of which may draw a different amount of electric power, depending on the state. Aside from the familiar "normal" and "power off" modes, in which the computer is running at full power or is turned off, other power modes include the low-power "suspend" and "sleep" modes. These low-power modes generally allow the computer to operate at a reduced level of power, albeit with reduced functionality.

During suspend mode, certain hardware devices which tend to draw large amounts of power, such as the hard disk drive or display, may be powered off to save electricity. The computer often initiates suspend mode automatically when the computer has not detected action from the user for a predetermined period of time, such as keystrokes or mouse movements. Computer programs running during suspend mode typically run normally, however, and the computer wakes up the suspended devices as needed. For instance, the computer monitor may turn off or darken the if no user activity is detected for a predetermined period of time, in order to save power. If the user moves the mouse or presses a key on the keyboard, then the monitor turns back on. Similarly, the hard disk drive may spin down if no data has been read from or written to disk for a predetermined time. As soon as the user saves a file or opens a file or application program, the disk drive wakes up to handle the data transfer. Although the computer often requires a short delay to wake up suspended hardware components, the computer can save great deal of power by suspending certain devices when they are not undergoing heavy use.

During sleep mode, nearly every device in the computer system, including the CPU, powers down; typically only the random access memory (RAM), which stores the data and programs running on the computer, and the I/O controller remain powered. As a result, computer activity ceases until the user brings the computer out of sleep mode, typically by pressing the "power on" button. Because the RAM remains powered on during sleep mode, the memory contents are preserved so that the computer returns to the same state that it was in when the sleep mode began. Sleep mode can begin automatically, usually after the computer detects no user activity for a long time, or can begin in response to a command from the user. Although sleep mode offers less functionality than the suspend mode, in fact rendering the computer temporarily unusable, the sleep mode also requires relatively little power and provides a high level of battery conservation that is especially desirable in portable systems.

Early implementations of the various power modes required the computer hardware itself to monitor user activity and determine the proper power state for each device in the computer system. More recently, the Advanced Configuration and Power Interface (ACPI) specification written by Intel, Microsoft, and Toshiba has introduced the concept of managing power functions using the computer operating system. Centralizing power management within software, in contrast with the original method of hardware-based power management, allows computer manufacturers to make simpler, less expensive hardware components that do not have to manage their own power states. Instead, these devices need only to respond to power management commands from the operating system. In addition, software-based power management permits the computer system implement highly complex power management procedures that may have been difficult, if not impossible, to realize using the more decentralized hardware-based approach of the past. Software-based power management also advantageously provides the user with some level power management control.

Taking advantage of the various power modes, more recent computer designs have incorporated a "warm docking" procedure in which the computer is placed in sleep mode during the docking sequence. Because entering sleep mode causes the expansion bus to power down, the computer can be connected to the docking station during sleep mode. In one implementation, the docking station includes a docking pin which makes contact with any computer that is placed into the dock. The docking pin connects electrically to the I/O controller within the computer, providing a sideband DOCKING signal, as illustrated in FIG. 1. Accordingly, when the user places the computer 100 into the dock 150, contact with the docking pin asserts a "docking" interrupt to the processor, to notify the processor that the docking sequence is beginning. In response, the processor places the computer into sleep mode, effectively deactivating the expansion bus and sideband signals. The I/O controller may remain awake during sleep mode, however, to monitor the DOCKING signal. The docking station 150 includes a mechanical hook for securing the computer 100. After the computer enters sleep mode, the docking station 150 grabs the computer 100 via the mechanical hook and pulls the computer 100 into the dock 150. Because the expansion bus and sideband signals are powered down during sleep mode, no electrical transient problems occur during warm docking. The docking station 150 then transmits another interrupt signal via the docking pin to notify the processor that the docking procedure has completed, and the computer 100 responds by returning to full-power mode.

A major problem with warm docking is that it can require a significant amount of time to return to full-power mode in some systems. Most computers require a relatively long time to power up, initialize, and enumerate various components, for instance. In particular, hard disk drives must undergo a rather lengthy wakeup period that requires extensive re-calibration. Consequently, warm docking can be too time-consuming for some users.

More recently, "hot docking" procedures have been developed that permit docking while the computer system is fully powered. In one implementation, the computer system and docking station incorporate a special docking safe circuit 135 coupled to the expansion buses. Upon detecting that a docking sequence has been initiated, the docking safe circuit 135 drive the expansion bus 125 to a docking safe state. In the docking safe state, the ground conductors of the expansion bus 125 are referenced to a common ground potential, the bus 125 is placed in a "quiet," or non-transitioning, state, all bidirectional terminals of the docking station bus 175 are set to an input state, and the signaling levels of the buses 125 and 175 have the same voltage potential. A major disadvantage to this hot docking procedure is that it requires providing the specialized docking safe circuitry 135 in the computer system. Due to the increasing demands by consumers to reduce the cost, size, and power consumption of computer systems, it is generally desirable to keep the number of components within computer systems to a minimum. The docking safe circuitry thus represents cost, size, and power burdens to the manufacturer.

For the foregoing reasons, a computer system capable of performing hot docking without the need for special docking safe circuitry would simplify and expedite the docking procedure without incurring the added costs of extraneous circuitry. Such an apparatus, if devised, should permit transient-free coupling of expansion bus signals as well as sideband signals between the computer and docking station during normal computer operation. Despite the apparent advantages that such a system would provide, to date, no such device has been developed that provides these features.

SUMMARY OF THE INVENTION

Accordingly, the present invention discloses a computer system capable of hot docking to an expansion base via an enhanced bus-to-bus bridge (or simply "bus bridge") that couples an expansion bus within the computer to an expansion bus within the docking station. The computer system takes advantage of the ACPI power specification to place the bus bridge in various power modes during docking and undocking. While docking, undocking, or operating in an undocked mode, the computer system powers down the bus bridge, effectively decoupling the computer's expansion bus from the docking station's expansion bus. Once docked, however, the computer powers on the bus bridge via the ACPI protocol, allowing communication along the coupled expansion buses between the computer and docking station. Because hot docking is safely implemented within the bus bridge, the computer system does not require the extra docking safe circuitry required for hot docking in prior systems.

The enhanced expansion bus bridge is configured to receive the docking indicator signal which was routed to an I/O controller in prior systems. Because the enhanced expansion bus bridge is capable of receiving the docking signal, the expansion bus is capable of transmitting an ACPI power management event (PME) interrupt to the processor in response to receiving the docking signal. Because the docking signal is asserted to indicate that the docking sequence has completed, the PME interrupt effectively notifies the processor when to power on the expansion bus bridge to connect to the dock.

In addition, the computer system includes a bank of switches that receive sideband signals from the docking station. The bus bridge provides an indicator signal to control the state of the switches. The bus bridge asserts the indicator signal to open the switches when the bus bridge is powered down or deasserts the indicator to close the switches when powered on. Thus, switches effectively decouple the computer system from sideband signals in the expansion base during docking, undocking, and undocked operation. Because the switches are closed when the bus bridge is powered on, the sideband signals from the dock are fully connected to the computer system during docked operation.

The computer generally comprises a processor coupled to a North bridge logic device by a processor bus, a main memory coupled to the North bridge logic device via a memory bus, a primary expansion bus coupled to the North bridge logic device. The primary expansion bus preferably comprises a PCI bus, although other buses are contemplated, and couples to a variety of bus components, including the bus bridge used for docking. The computer system may further include a South bridge logic device coupling the primary expansion bus to one or more secondary expansion buses. Accordingly, a secondary bus may support various peripheral components, including a BIOS ROM, one or more disk drives, and an input/output controller capable of receiving keyboard and mouse input signals.

The expansion bus bridge used to couple the computer system and docking station generally comprises a bridge management logic device that facilitates bus transactions between the computer system and docking station. In a preferred embodiment, the expansion bus comprises a PCI bus, and the computer PCI bus and docking station PCI bus function as the primary and subordinate PCI buses, respectively. A plurality of switches couple the data, address, and control lines comprising the primary bus to the corresponding signals of the subordinate expansion bus. As governed by the ACPI protocol, the bus bridge includes a compatible power control unit capable of placing the bus bridge into various ACPI defined lower modes, including D0, D1, D2, and D3 modes, and of placing the primary and subordinate uses into various ACPI power modes, including B0, B1, B2, and B3 modes. The ACPI control unit provides a switch control signal that opens the switches when the bus bridge transitions to the D3 mode and closes the switches when the bus bridge transitions to the D0 mode. Hence, the switches decouple the primary bus from the subordinate bus when bus bridge occupies the D3 mode. The switches preferably comprises field effect transistor (FET) switches.

The computer system includes a docking connector for coupling to the docking station, and the docking connector provides a "docked" signal the bus bridge to indicate that the computer system has docked with the expansion base. While undocked, the computer's operating system keeps the bus bridge in the D3, or "off," mode. Accordingly, the bus bridge powers down the interface to the subordinate bus by placing the subordinate bus in the B3, or "off," mode. As explained above, the switches in the bridge decouple the primary and subordinate buses during the D3 mode so that the computer system can safely remain powered and operational when docking.

In addition to the switches that decouple the primary and subordinate buses, the computer system includes an additional bank of switches for decoupling sideband signals that run between the computer and expansion base. The bus bridge provides the switch control signal to the bank of switches, so that the bank of switches open to decouple the sideband signals when the bus bridge occupies the D3 mode. Accordingly, the computer sideband signals and expansion base sideband signals can couple safely while the bridge occupies the D3 mode.

After docking, the expansion base asserts the "docked" signal to the computer. In response, the ACPI control unit transmits a PME "docked" interrupt to the operating system, which then places the bus bridge in the D0, or filly powered, mode. The bus bridge deasserts the switch control signal when in the D0 mode, closing the switches that couple the expansion bus and sideband signals, and places the subordinate expansion bus into the B0, or fully powered, mode. The computer is then fully docked and can access docking station resources immediately.

Thus, the present invention comprises a combination of features and advantages that enable it to substantially advance the art by providing a hot dockable computer system that can be implemented using an enhanced bus bridge but without need for the specialized docking safe circuitry required by prior devices. These and various other characteristics and advantages will be readily apparent to those skilled in the art upon reading the following detailed description of the preferred embodiments and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 3 illustrates the block diagram of a preferred embodiment of the P2P bridge of FIG. 2;

DETAILED DESCRIPTION OF PREFERRED EMBODIMENTS

Figure 1:
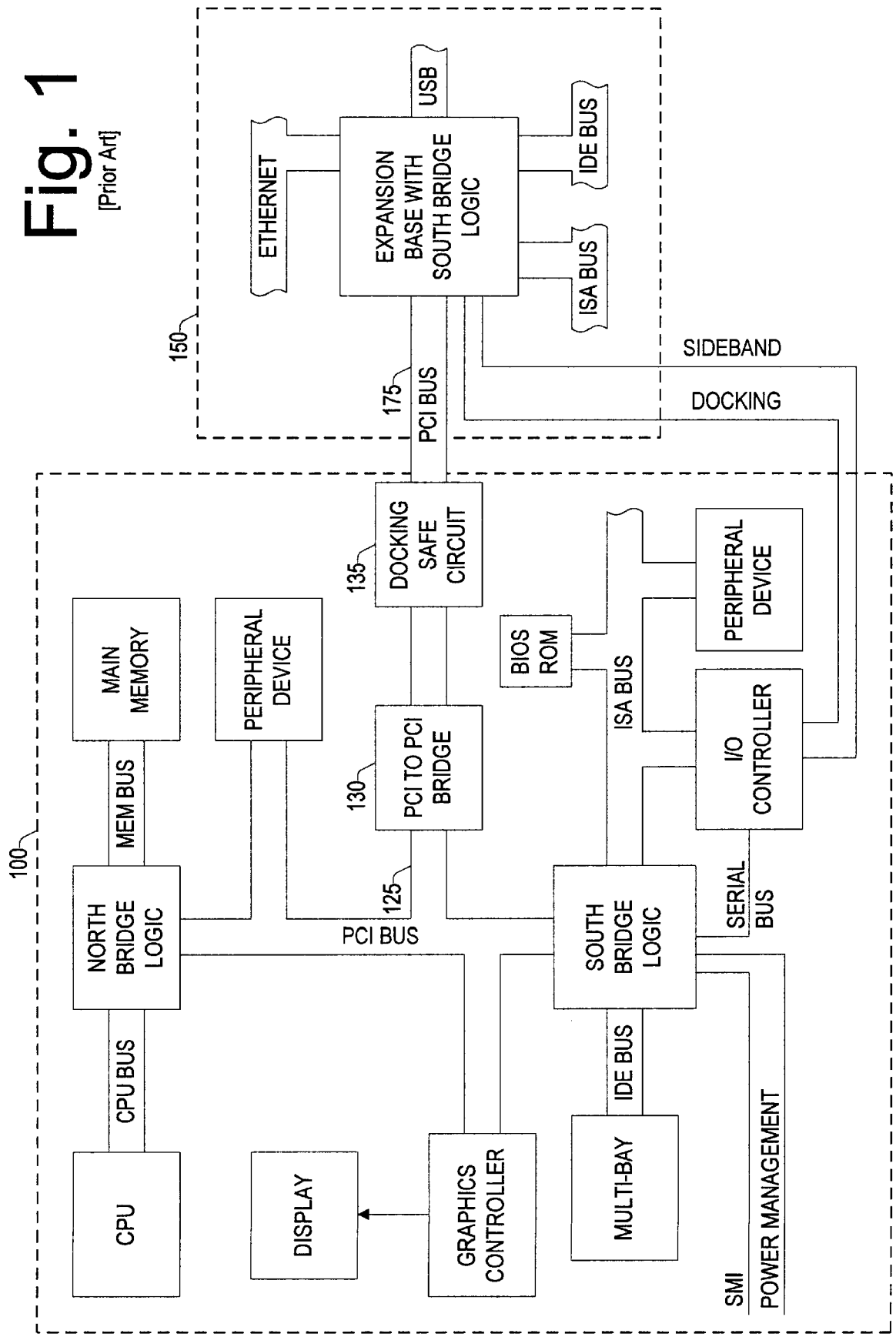
FIG. 1 illustrates the block diagram of a conventional laptop computer system and docking station configuration.
Figure 2:
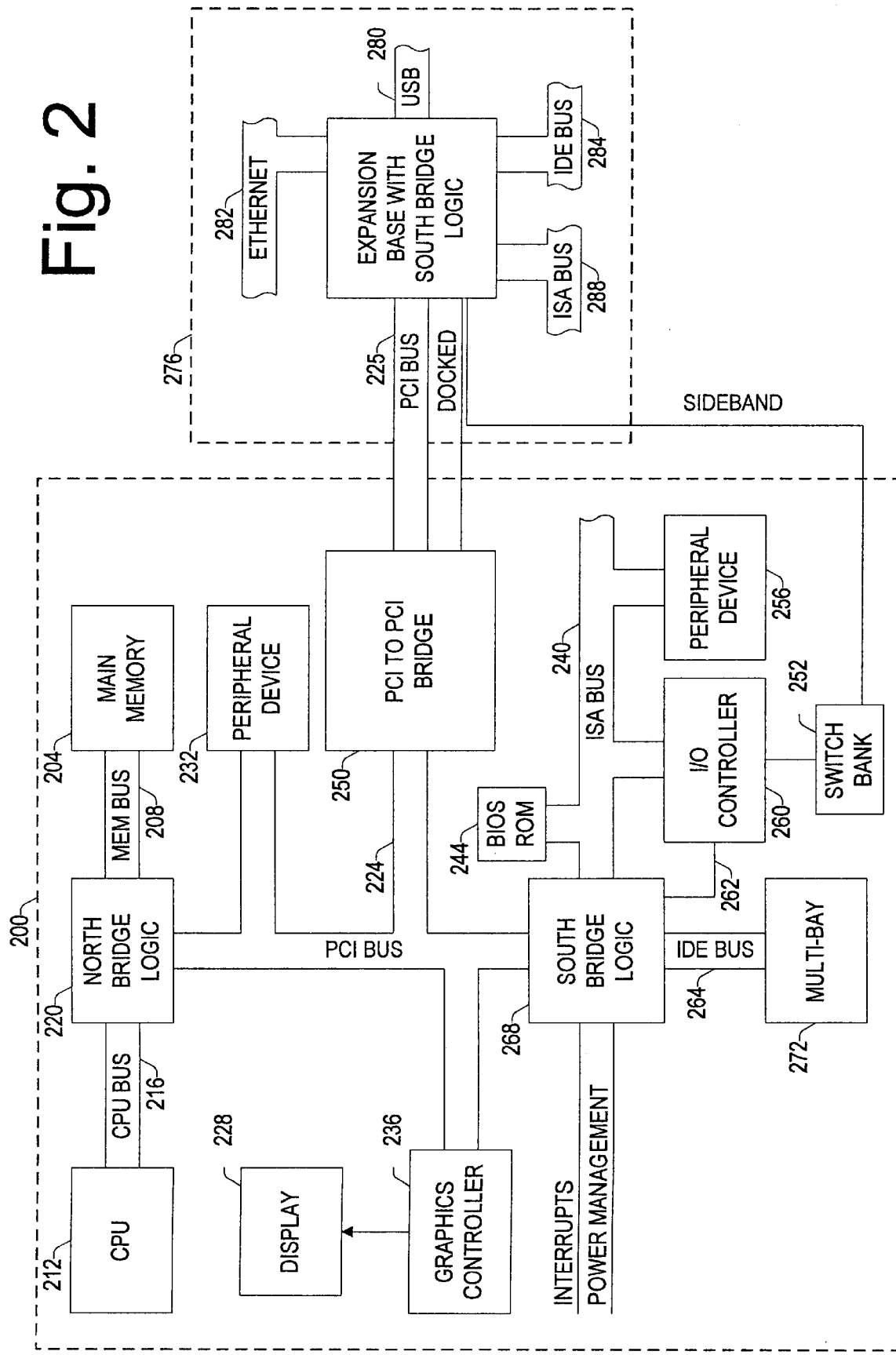
FIG. 2 illustrates the block diagram of a portable computer system constructed in accordance with a preferred embodiment and coupled to a docking station.

FIG. 2 illustrates a computer system 200 constructed in accordance with a preferred embodiment and coupled to a docking station 276. Although shown as coupled, thus depicting docked operation, the computer system 200 and expansion base 276 may be decoupled, or "undocked," as will be described below.

Computer system 200 generally includes a processor or CPU 212 coupled to a main memory array 204 and a variety of other peripheral computer system components through an integrated North bridge logic device 220. The CPU 212 preferably couples to bridge logic 220 via a CPU bus 216, or the bridge logic 220 may be integrated into the CPU 212. The CPU 212 may comprise, for example, a Pentium® II microprocessor. It should be understood, however, that computer system 200 could include other alternative types of microprocessors. Further, an embodiment of computer system 200 may include multiple processors, with each processor coupled through the CPU bus 216 to the bridge logic unit 220.

The main memory array 204 preferably couples to the bridge logic unit 220 through a memory bus 208, and the bridge logic 220 preferably includes a memory control unit (not shown) that controls transactions to the main memory 204 by asserting the necessary control signals during memory accesses. The main memory 204 functions as the working memory for the CPU 212 and generally includes a conventional memory device or array of memory devices in which program instructions and data are stored. The main memory array may comprise any suitable type of memory such as dynamic random access memory (DRAM) or any of the various types of DRAM devices such as synchronous dynamic random access memory (SDRAM), extended data output dynamic random access memory (EDO DRAM), or Rambus™ dynamic random access memory (RDRAM).

The computer system 200 also preferably includes a graphics controller 236 that couples to the bridge logic 220 via an expansion bus 224. As shown in FIG. 2, the expansion bus 224 comprises a Peripheral Component Interconnect (PCI) bus. Alternatively, the graphics controller 236 may couple to bridge logic 220 through an additional Advanced Graphics Port (AGP) bus (not specifically shown). As one skilled in the art will understand, the graphics controller 236 controls the rendering of text and images on a display device 228. The graphics controller 236 may embody a typical graphics accelerator generally known in the art to render three-dimensional data structures on display 228. These data structures can be effectively shifted into and out of main memory 204 via the expansion bus and bridge logic 220. The graphics controller 236 therefore may be a master of the expansion bus (including either PCI or AGP bus) enabling the graphics controller 236 to request and receive access to a target interface within the bridge logic unit 220, including the memory control unit. This mastership capability permits the graphics controller 236 to access main memory 204 without the assistance of the CPU 212. A dedicated graphics bus accommodates rapid retrieval of data from main memory 204. As will be apparent to one skilled in the art, the bridge logic 220 includes a PCI interface to permit master cycles to be transmitted and received by bridge logic 220. If an AGP bus is included in the system, the bridge logic 220 also includes an interface for initiating and receiving cycles to and from components on the AGP bus. The display 228 comprises any suitable electronic display device upon which an image or text can be represented. A suitable display device may include, for example, a cathode ray tube (CRT), a liquid crystal display (LCD), a thin film transistor (TFT), a virtual retinal display (VRD), or any other type of suitable display device for a computer system.

In the preferred embodiment as shown in FIG. 2, the expansion bus 224 comprises a Peripheral Component Interconnect (PCI) bus. The present invention, however, is not limited to any particular type of expansion bus, and thus various buses may be used, including a high speed (66 MHz or faster) PCI bus. In the preferred embodiment, a plurality of PCI peripheral devices may reside on the PCI bus 224. The PCI devices may include any of a variety of peripheral devices such as, for example, network interface cards (NIC's), video accelerators, audio cards, hard or floppy disk drives, Personal Computer Memory Card International Association (PCMCIA) drives, Small Computer Systems Interface (SCSI) adapters and telephony cards. Although only one PCI peripheral device 232 is depicted in FIG. 2, it should be recognized that computer system 200 may include any number of PCI devices as desired.

The following discussion describes the preferred embodiment of computer system 200 for a laptop computer that can be connected to an expansion base 276 via the PCI bus. This should not be construed as limiting the present invention to a laptop. The present invention also may be used with a desktop system, work station, server, or handheld computer. In addition and as mentioned above, computer system 200 can be implemented with respect to the particular bus architectures shown in FIG. 2 (i.e., PCI bus), or other bus architectures, as desired. The embodiment described herein, however, assumes that the expansion base and computer are coupled via PCI buses, as shown in FIG. 2, and thus the following discussion will focus on configuring the present invention for that embodiment. Further, CPU 212 preferably comprises a Pentium® II processor and thus CPU bus 216 represents a Pentium® II bus. These bus protocols and the terminology used with respect to these protocols are well known to those of ordinary skill in the art. If a more thorough understanding of the PCI, or Pentium® II bus is desired, reference should be made to the *PCI Local Bus Specification*(1993) and *Intel P6 External Bus Specification*. If an AGP bus also is used in the computer system, reference may be made to the *Accelerated Graphics Port Interface Specification*(Intel, 1996).

Referring still to FIG. 2, a South bridge logic device 268 preferably connects to expansion bus 224. The South bridge 268 couples or "bridges" the primary expansion bus 224 to other secondary expansion buses. These other secondary expansion buses may include an ISA (Industry Standard Architecture) bus, a sub-ISA bus, a USB (Universal Serial Bus), an IDE bus, an IEEE 1394 standard (or "Firewire") bus, or any of a variety of other buses that are available or may become available in the future. In the preferred embodiment of FIG. 2, the South bridge logic 268 couples to a sub-ISA bus 240, a USB bus 248 and an IDE bus 264. As will be apparent to one skilled in this art, various peripheral devices may be coupled to each of these buses. Thus, as shown in the preferred embodiment of FIG. 2, an I/O controller chip 260 connects to the sub-ISA bus 240, as do various other ISA-compatible devices 156 and BIOS ROM 244. Similarly, according to the preferred embodiment, a multi-bay configuration 272 couples to the IDE bus 264 and to the I/O controller 260. The multi-bay configuration preferably includes three independent bays connected in any master/slave, primary/secondary configuration supporting hot-plugging of IDE devices in the bays. As one skilled in the art will understand, various IDE devices are available including CD ROM drives, floppy drives, tape drives, and the like. The USB 248 supports various peripherals, especially video peripherals such as video cameras for teleconferencing purposes. In addition to the buses discussed above, the South bridge 268 also preferably connects to interrupt signal lines, power management signal lines, and serial bus 262.

As noted above, the computer system 200 preferably comprises a laptop computer. To facilitate use of the computer system 200 within a traditional desktop environment, an expansion base 276 preferably is available for connecting the laptop computer system to additional peripheral devices and to a computer network via an Ethernet bus. The expansion base 276 may include any type of configuration, including a port replicator or docking station. The present invention envisions, however, that the expansion base 276 also includes a South bridge logic (not shown specifically) for coupling components on the PCI bus 224 to other components coupled to the expansion base. Thus, as shown in FIG. 2, a South bridge logic device within the expansion base 276 couples the PCI bus 225 to various expansion buses including an ISA bus 288, USB 280 and IDE bus 284.

Computer system 200 also includes a PCI-to-PCI (P2P) bridge 250 for coupling the computer PCI bus 224 to the dock PCI bus 225. During normal docked computer operation, the P2P bridge 250 generally functions as a standard P2P bridge by facilitating transactions between the two PCI buses 224 and 225. In accordance with standard P2P bridge protocol, one of the two PCI buses supported by the P2P bridge is designated as the "primary" bus and the other bus as the "subordinate" bus. Accordingly, the primary bus operates as the "main" PCI bus of the computer system, while the subordinate bus operates as an "expansion" PCI bus to extend the functionality of the primary PCI bus. In a preferred embodiment, the P2P bridge designates the computer PCI bus 224 as the primary PCI bus and the dock PCI bus 225 as the subordinate PCI bus. As one of ordinary skill in the art would recognize, the P2P bridge 250 could be housed in either the computer system 100 or the docking station 276.

Referring still to FIG. 2, in addition to supporting normal PCI transactions, P2P bridge 250 includes hot docking circuitry to permit connecting the computer 100 to the docking station without having to place the computer system 100 into a low-power state such as suspend or sleep mode. Computer system 100 also includes bank of switches 252 coupled to the I/O controller 260 and that receive various sideband signals from the docking station 276. In a preferred embodiment, however, the P2P bridge 250 receives the DOCKED sideband signal from the expansion base 276. The switch bank 252 preferably is constructed using an array of standard field effect transistor (FET) switches, as is known to one of ordinary skill in the art. Accordingly, each switch couples one sideband signal in the dock 276 to the corresponding sideband signal in the computer 200. The P2P bridge 250 provides a BRIDGE IN D3 signal to the switch bank 252, in order to control the state of the FET switches. When the BRIDGE IN D3 signal is not asserted, the switches in the switch bank 252 close, connecting the sideband signals from the dock 276 to the I/O controller 260. If the BRIDGE IN D3 signal is asserted, however, then the switches 252 open to disconnect the sideband signals.

Turning now to FIG. 3, the P2P bridge 250 generally comprises standard bridge management logic 300 for managing normal PCI transactions between a pair of PCI buses. The bridge management logic 300 couples to the various PCI signals on both PCI buses 224 and 225, including ADDRESS, DATA, and CONTROL signals. Bridge management logic 300 is typical of circuitry found in devices such as the 21554 PCI-to-PCI bridge manufactured by Intel Corporation. The bridge management logic 300 preferably conforms to the principles and PCI bus protocols taught in standard PCI bus reference manuals published by the PCI Special Interest Group, the organization that develops and governs the PCI protocol. Publications that describe how to implement a standard PCI bus bridge include the *PCI Specification, Rev.* 2.0, the *PCI to PCI Bridge Specification, Rev.* 1.0, *Mobile Design Guide*, and *Power Management Specification* 1.1, all published by the PCI Special Interest Group. The principles taught in these documents are well known to those of ordinary skill in the art and are herein incorporated by reference.

In addition to the standard PCI-to-PCI transaction circuitry, the P2P bridge 250 includes an ACPI control unit 310 coupled to the bridge management logic 300 and an array of internal FET switches 304 coupling the computer PCI bus signals to the dock PCI bus signals. Although not specifically illustrated in FIG. 3, each PCI bus signal couples to a distinct switch. Thus, the number of switches 304 equals the number of PCI bus signals. The ACPI control unit 310 provides the BRIDGE IN D3 signal to the switches 304 in order to control the state of the internal switches 304. When asserted, the BRIDGE IN D3 causes internal switches 304 to open. When deasserted, the BRIDGE IN D3 closes the internal switches 304. When the switches 304 open, the PCI buses 224 and 225 decouple. Similarly, the PCI buses 224 and 225 couple when switches 304 close.

The P2P bridge 250 preferably conforms to the Advanced Configuration and Power Interface Specification (ACPI) published by Intel, Microsoft, and Toshiba. The principles governing ACPI are detailed in the *ACPI Specification, Revision* 1.0, which is hereby incorporated by reference. The ACPI features provide support for placing the PCI buses 224 and 225 and the P2P bridge 250 into four different power states known as the D0, D1, D2, and D3 states. The D0 state corresponds to normal P2P bridge operation, in which the P2P bridge 250 is fully powered. The P2P bridge 250 is completely active and responsive in the D0 state and thus consumes the most power. The D1 state offers slightly less functionality than the D0 state but requires less power. During the D1 state, the PCI buses 224 and 225 are idle. The D2 state offers an additional level of power savings over the D1 state but provides less functionality. In the D2 state, the PCI buses 224 and 225 are idle and the clock used to synchronize PCI and bus bridge operations (not specifically shown) is halted. In the D3 state, the P2P bridge 250 effectively shuts down and becomes nonresponsive to PCI bus transactions. In addition, power to the bridge 250 may be terminated. In the D3 state, the bridge 250 responds only to commands to change power states.

The ACPI protocol also provides for different bus power states known as the B0, B1, B2, and B3 states. Similarly to the D0 state, the B0 state corresponds to a fully operational bus. Likewise, the B3 state corresponds to an "off," bus. In accordance with the ACPI protocol, a P2P bridge that is in the D3 power state must place its subordinate bus in the B3, or off, state. The B1 and B2 states correspond to intermediate power states that require relatively little power but that offer reduced functionality compared to B0 operation.

In a preferred embodiment, the P2P bridge 250 is capable of transmitting power management event (PME) interrupts and other standard ACPI event messages to the operating system in accordance with the ACPI protocol. The ACPI specification includes a general event model used for Plug and Play, Thermal, and Power Management events. The power management events can indicate various conditions, including that the user may have initiated a docking sequence, that a docking sequence has completed, that a phone call may have been detected (by a modem, for instance), or that the user pressed the power button. After receiving a PME interrupt, the operating system software running on the CPU 212 takes actions to handle the power management event, as appropriate.

When not coupled to the docking station 276, the computer system 100 preferably holds the P2P bridge 250 in the ACPI D3 power state. While in the D3 state, the ACPI control logic 310 asserts the BRIDGE IN D3 signal, which opens the internal switches 304 as well as the FET array switches 252. Hence, the I/O controller 260 remains decoupled from sideband I/O signals while the bridge 250 is in D3. Further, the P2P bridge 250 places the pins corresponding to the subordinate bus (which is not actually connected to the bridge) in the B3, or off, state. While the bridge 250 is in the D3 state, the computer 100 can connect to the dock without risking electrical problems on the PCI bus 224 or through the sideband signals, even if the computer is fully operational. Hence, the user can dock the computer 100 at any time, without shutting down the system or initiating sleep mode, because the switches 252 and 304 isolate the computer system 100 from transients and other electrical anomalies which may occur when mating the computer 100 with the docking station 276.

Figure 4A:
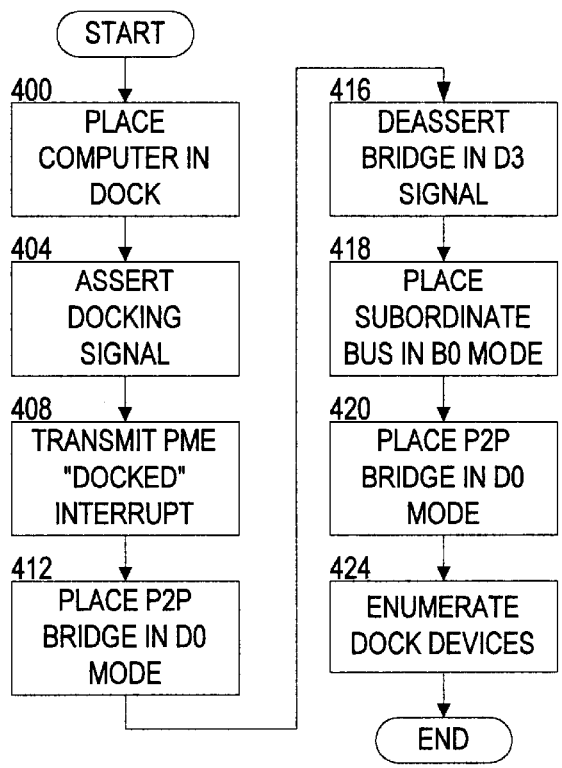
FIG. 4A is a flow chart illustrating a hot docking procedure in accordance with a preferred embodiment.

Referring now to FIG. 4A, the docking sequence generally begins by mating the computer 100 to the docking station 276 (block 400). When the computer 100 has completely connected with the docking station 276, including connected to the docking pin, the docking station 276 asserts the DOCKED signal through the docking pin (block 404). Upon detecting the asserted DOCKED signal, the ACPI control unit 310 transmits a power management event (PME) "docked" interrupt to the operating system in block 408. The PME "docked" interrupt indicates that the docking sequence has completed. Because the P2P bridge 250 is still in the D3 state just after the docking sequence completes, ACPI control unit 310 continues to assert the BRIDGE IN D3 signal, holding the sideband FET switches 252 and the PCI bridge switches 304 open. Accordingly, the sideband signals coupled to the IPO controller 260 remain decoupled from the corresponding sideband signals in the dock 276, and the PCI buses 224 and 225 remain decoupled as well.

In response to the "docked" PME, however, the computer system 100 transmits an ACPI message to the ACPI control unit 310 to place the P2P bridge 250 into the D0 state (block 412). Accordingly, the ACPI control unit 310 deasserts the BRIDGE IN D3 signal, closing the internal PCI bus switches 304 and the sideband FET switches 252 (block 416). The computer system 100 thus has full contact with all docking station 276 sideband signals, including interrupt signals transmitted from the docking station. Further, the docking station PCI bus 225 becomes fully connected to the computer PCI bus 224. The ACPI control unit 310 then places the subordinate PCI bus 225 into the B0, or fully operational state (block 418), and then the P2P bridge 250 transitions to the fully-powered, D0 state in block 420. The computer system 100 then can enumerate and configure the docking station through known protocols to incorporate the docking station devices into overall computer operation, completing the docking sequence (block 424).

Figure 4B:
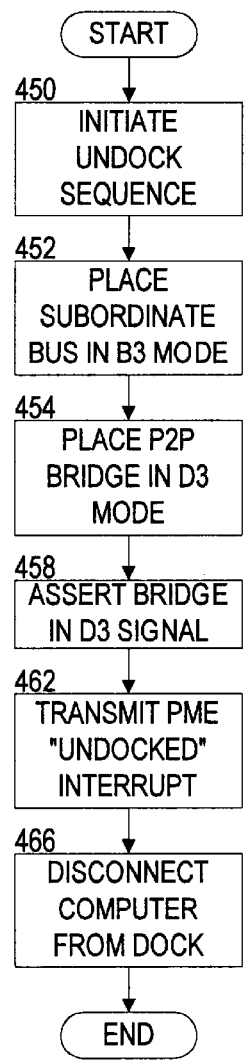
FIG. 4B is a flow chart illustrating a hot undocking procedure in accordance with a preferred embodiment.

The computer or computer user may initiate an undocking sequence in various ways, including actuating a disconnect switch (not shown) or invoking an "undock" software routine to run on the CPU 212, perhaps as a software applet, control panel, or other type of program. In fact, it should be understood that the docking and undocking sequences can be initiated by any desired means without departing from the principles of this disclosure. FIG. 4B illustrates the preferred undocking sequence. After the undock sequence is initiated in block 450, the computer 100 transmits an ACPI message to place the P2P bridge 250 into the D3 state. In response to the ACPI message, the ACPI control unit 310 places the subordinate PCI bus 225 into the B3, or "off," state (block 452) and powers the P2P bridge 250 down to the D3 state (block 454). The ACPI control unit 310 also asserts the BRIDGE IN D3 signal (block 458) to open the sideband FET switches 252 and the PCI dock switches 304. Accordingly, the computer system 100 disconnects from the sideband signals and subordinate PCI bus 225.

In block 462, the ACPI control unit 310 preferably transmits an ACPI PME message "undocked." The "undocked" PME notifies the operating system that the bridge 250 and sideband signals have disconnected from the dock and that the bridge 250 has powered down. Accordingly, the computer 100 system disconnects from the dock in block 466. The computer 100 may disconnect in any desired manner, without departing from the principles described herein. The docking station 276 may automatically eject the computer 100, or the user may physically pull the computer from the docking station, for example. Further, it should be understood that the steps for docking and undocking the computer 100 may be implemented in any desired order.

Accordingly, the principles introduced in this disclosure permit hot docking and undocking virtually any type of portable computer to and from a compatible expansion base during normal computer operation. Because the computer maintains fall power throughout the docking procedure, the computer user can use the computer instantly after mating the computer and the dock, without waiting for the computer to boot up or wake up from a low-power mode. Further, programs running on the CPU can continue uninterrupted throughout the docking sequence. In addition, the principles described herein do not require an extensive array of docking safe circuitry that was necessary in prior art hot docking devices. Instead, the hot docking computer system utilizes an enhanced expansion bus bridge to isolate the computer and docking station during the mating procedure. Numerous variations and modifications will become apparent to those skilled in the art once the above disclosure is fully appreciated. It is intended that the following claims be interpreted to embrace all such variations and modifications.

I claim:

1. A bus bridge device for coupling multiple computer expansion buses, comprising:
   a bridge management logic device adapted to couple to a plurality of expansion buses, said bridge management logic device capable of facilitating bus transactions between said plurality of expansion buses;
   a power control unit coupled to said bridge management logic, said power control unit capable of placing a first bus of said plurality of expansion buses into an off power state, said power control unit also receiving a docking signal input to said bus bridge device; and
   wherein said power control unit is adapted to place said first bus into an off power state if the docking signal is deasserted.

2. The bus bridge device of claim 1 further comprising an internal switch adapted to couple said first bus to a second bus of said plurality of expansion buses, and wherein said internal switch is open if the docking signal is deasserted.

3. The bus bridge device of claim 2 wherein said internal switch comprises a FET switch.

4. The bus bridge device of claim 2 wherein said power control unit provides a control signal to open and close said internal switch.

5. The bus bridge device of claim 4 wherein said power control unit closes said internal switch if the docked signal is asserted.

6. The bus bridge device of claim 4 wherein the control signal comprises an output signal from said bus bridge device.

7. The bus bridge device of claim 4 wherein said power control unit comprises an ACPI control unit, and wherein said ACPI control unit is capable of transmitting an interrupt over said first bus if said docking signal becomes asserted.

8. The bus bridge device of claim 7 wherein said first bus and said second bus comprise PCI buses.

9. The bus bridge device of claim 7 wherein said ACPI control unit is capable of placing said second bus in the B3 power state if the docking signal is deasserted.

10. A bus bridge configured to support mating a computer system having a first bus to a docking station having a second bus, said bus bridge comprising:
    a bridge management logic device adapted to interface said first bus and said second bus, said bridge management logic device including a switch that couples to said first bus and to said second bus;
    a power control unit coupled to said bridge management logic, said power control unit capable of deactivating said second bus, said power control unit further capable of opening and closing said switch; and
    wherein said bus bridge includes a docking input signal coupled to said power control unit.

11. The bus bridge of claim 10 wherein said switches comprise FET switches.

12. The bus bridge of claim 10 wherein said power control unit comprises an ACPI-compliant control unit, and wherein said power control unit is capable of placing said second bus in the ACPI B0 if the docking signal is asserted.

13. The bus bridge of claim 12 wherein said power control unit closes said switch to couple said first bus to said second bus if said second bus is placed in the ACPI B0 mode.

14. The bus bridge of claim 10 wherein said power control unit comprises an ACPI-compliant control unit, and wherein said power control unit is capable of placing said second bus in the ACPI B3 mode to permit said computer system to operate undocked from said docking station.

15. The bus bridge of claim 14 wherein said power control unit opens said switch to decouple said first bus from said second bus if said second bus is placed in the ACPI B3 mode.

16. The bus bridge of claim 10 wherein said power control unit comprises an ACPI-compliant control unit, and wherein said power control unit is capable of transmitting an interrupt over said first bus if the docking signal becomes asserted.

17. The bus bridge of claim 16 wherein the interrupt comprises a power management event interrupt.

18. The bus bridge of claim 10 wherein said power control unit closes said switch to couple said first bus to said second bus after said computer system docks with said docking station.

19. The bus bridge of claim 18 wherein said power control unit provides a select signal to open and close said switch.

20. The bus bridge of claim 19 wherein the select signal is provided as an output signal of said bus bridge.

21. A computer system comprising:
    a processor that executes program instructions;
    a memory device coupled to said processor bus, said memory device capable of storing data and program instructions;

a primary expansion bus coupled to said processor and said memory device;

a bridge logic device coupled to said primary expansion bus and that is adapted to couple to a subordinate expansion bus, said bridge logic device capable of receiving a docking indicator input signal; and wherein said computer system isolates said primary expansion bus from said subordinate expansion bus by deactivating said bridge logic device if the docking indicator signal is de-asserted.

22. The computer system of claim 21 wherein said bridge logic device transmits an interrupt to said processor if the docking indicator signal is asserted.

23. The computer system of claim 22 wherein said interrupt comprises an ACPI PME interrupt.

24. The computer system of claim 21 wherein an asserted docking indicator signal indicates that the computer is connecting to a docking station, and wherein said computer system is capable of activating said bridge logic device after a establishing docking connection.

25. The computer system of claim 24 wherein said bridge logic device is adapted to transmit an interrupt to said processor to indicate that a docking connection has been established.

26. The computer system of claim 25 wherein the interrupt comprises an ACPI PME interrupt.

27. The computer system of claim 21, further including:
an internal sideband signal for carrying sideband data signals from a docking station;
a sideband switch coupled to said internal sideband signal;
an external sideband signal coupled to said sideband switch for connecting to said docking station; and
wherein said bridge logic device provides an indicator signal to control the position of said sideband switch.

28. The computer system of claim 27 wherein said bridge logic device asserts the indicator signal to open said sideband switch while said bridge logic device operates in a low-power mode.

29. The computer system of claim 28 wherein said bridge logic device deasserts the indicator signal to close said sideband switch while said bridge logic device operates in full-power mode.

30. The computer system of claim 21 wherein said bridge logic device comprises:
a switch coupling said primary expansion bus and said subordinate expansion bus;
a bridge management logic device adapted to control bus transactions between said primary expansion bus and said subordinate expansion bus; and
a power control unit coupled to said switch and to said bridge management logic unit, wherein said power control unit opens said switch to decouple said expansion bus from said subordinate expansion bus if said bridge logic device is deactivated.

31. The computer system of claim 30 wherein said power control unit comprises an ACPI control unit.

32. The computer system of claim 21 wherein said primary expansion bus and said subordinate expansion bus comprise PCI buses.

33. A method for connecting a computer system to a docking station, comprising:
(a) deactivating a bus bridge within said computer system while said computer system is fully powered; and
(b) coupling said bus bridge to said docking station while said bus bridge is deactivated.

34. The method of claim 33 wherein (a) comprises placing said bus bridge into the ACPI D3 power mode.

35. The method of claim 33 including:
(c) receiving at said bus bridge a docking signal that indicates that said computer system is coupled to said docking station; and
(d) transmitting a first interrupt from said bus bridge to indicate receiving the docking signal.

36. The method of claim 35 wherein said bus bridge is activated in response to (d).

37. The method of claim 36 wherein said bus bridge comprises an ACPI-compatible device and wherein said interrupt comprises an ACPI Power Management Event.

38. The method of claim 36 including:
coupling said computer system to said docking station using a switch;
providing a control signal from said bus bridge to control the position of said switch; and
asserting the control signal to open said switch if said bus bridge is deactivated.

39. The method of claim 38 wherein said switch couples said docking station to an expansion bus signal in said computer system.

40. The method of claim 38 wherein said switch couples a sideband signal connecting said computer system to said docking station.

41. The method of claim 33 further comprising activating said bus bridge after coupling said bus bridge to said docking station.

42. The method of claim 41 wherein activating said bus bridge comprises placing said bus bridge into the ACPI D0 power mode.

43. The method of claim 41 including:
(c) receiving at said bus bridge a docking signal that indicates that said computer system is coupled to said docking station; and
(d) transmitting an interrupt from said bus bridge to indicate receiving the docking signal.

44. The method of claim 43 wherein said bus bridge is activated in response to (d).

45. The method of claim 44 wherein said bus bridge comprises an ACPI-compatible device and wherein said interrupt comprises an ACPI Power Management Event.

46. A method for connecting a computer system to a docking station, comprising:
(a) sensing that the computer system is disconnected from the docking station;
(b) deactivating a bus bridge within said computer system while said computer system is fully powered; and
(c) coupling said bus bridge to said docking station while said bus bridge is deactivated.

47. The method of claim 46 including:
(d) receiving at said bus bridge a docking signal that indicates that said computer system is coupled to said docking station; and
(e) transmitting a first interrupt from said bus bridge to indicate receiving the docking signal.

48. The method of claim 47 wherein said bus bridge is activated in response to (e).

49. The method of claim 48 including:
coupling a signal in said computer system to a signal in said docking station using a switch;
providing a control signal from said bus bridge to control the position of said switch; and
asserting the control signal to open said switch if said bus bridge is deactivated.

50. The method of claim 46 further comprising activating said bus bridge after coupling said bus bridge to said docking station.

51. The method of claim 50 including:
(d) receiving at said bus bridge a docking signal that indicates that said computer system is coupled to said docking station; and
(e) transmitting an interrupt from said bus bridge to indicate receiving the docking signal.

52. The method of claim 51 wherein said bus bridge is activated in response to (e).

* * * * *